(12) United States Patent
Rappard et al.

(10) Patent No.: US 12,706,954 B2
(45) Date of Patent: Aug. 11, 2026

(54) ENABLING DEVICE CONTEXT AWARENESS, DATA INGESTION AND REAL-TIME ACTIONS IN MOBILE NETWORKS

(71) Applicant: Palo Alto Networks, Inc., Santa Clara, CA (US)

(72) Inventors: Mitchell Rappard, Lee's Summit, MO (US); Justin Tyler Rorabaugh, Pflugerville, TX (US); Lior Kolnik, Leander, TX (US); John Plant, Cedar Park, TX (US); Leonid Burakovsky, Pleasanton, CA (US); Sachin Verma, Danville, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 65 days.

(21) Appl. No.: 18/439,415

(22) Filed: Feb. 12, 2024

(65) Prior Publication Data

US 2025/0260722 A1 Aug. 14, 2025

(51) Int. Cl.
*H04L 9/40* (2022.01)
*H04L 61/503* (2022.01)

(52) U.S. Cl.
CPC ............ *H04L 63/20* (2013.01); *H04L 61/503* (2022.05)

(58) Field of Classification Search
CPC .............................. H04L 63/20; H04L 61/503
See application file for complete search history.

(56) References Cited

U.S. PATENT DOCUMENTS

| | | | | |
|---|---|---|---|---|
| 11,038,841 | B2 * | 6/2021 | Palnati | H04L 63/0209 |
| 11,128,673 | B2 * | 9/2021 | Russell | H04L 65/1073 |
| 2010/0208661 | A1 * | 8/2010 | Sun | H04W 88/10 370/328 |
| 2021/0409375 | A1 * | 12/2021 | Burakovsky | H04L 63/1458 |
| 2022/0124120 | A1 | 4/2022 | Verma | |
| 2022/0391892 | A1 * | 12/2022 | Wied | G06F 16/2308 |

(Continued)

FOREIGN PATENT DOCUMENTS

| | | |
|---|---|---|
| EP | 3902226 | 12/2022 |

OTHER PUBLICATIONS

3GPP, 3GPP TS 23.501 V17.5.0 (Jun. 2022), 3rd Generation Partnership Project; Technical Specification Group Services and System Aspects; System architecture for the 5G System (5GS); Stage 2 (Release 17), pp. 1-568.

(Continued)

*Primary Examiner* — SM A Rahman
(74) *Attorney, Agent, or Firm* — Van Pelt, Yi & James LLP

(57) ABSTRACT

Techniques for data ingestion enabling context awareness and real-time actions in mobile networks are disclosed. In some embodiments, a system, a process, and/or a computer program product for data ingestion enabling context awareness and real-time actions in mobile networks includes extracting a plurality of parameters from a mobile core network entity using an application programming interface (API) call, messages over a message broker, and/or logs from the mobile core network entity; determining a context for a session using one or more of the plurality of parameters associated with a mobile device communicating over the mobile core network; and applying a security policy using a security platform to the session based on the context.

21 Claims, 10 Drawing Sheets

(56) References Cited

U.S. PATENT DOCUMENTS

| | | | | |
|---|---|---|---|---|
| 2023/0421582 | A1* | 12/2023 | McCarthy | H04L 63/1425 |
| 2025/0023855 | A1* | 1/2025 | Goodman | H04L 63/08 |
| 2025/0053663 | A1* | 2/2025 | Suto | G06F 21/577 |

OTHER PUBLICATIONS

3GPP, 3GPP TS 23.003 V16.9.0 (Mar. 2022), 3rd Generation Partnership Project, Technical Specification Group Core Network and Terminals, Numbering, addressing and identification, (Release 16), pp. 1-143.

3GPP, 3GPP TS 29.244 V18.3.0 (Sep. 2023), 3rd Generation Partnership Project; Technical Specification Group Core Network and Terminals; Interface between the Control Plane and the User Plane Nodes; Stage 3 (Release 18), pp. 1-412.

ETSI, ETSI TS 129 061 V17.6.0 (May 2022), Digital cellular telecommunications system (Phase 2+) (GSM); Universal Mobile Telecommunications System (UMTS); LTE; 5G; Interworking between the Public Land Mobile Network (PLMN) supporting packet based services and Packet Data Networks (PDN), 3GPP TS 29.061 version 17.6.0 Release 17, pp. 1-184.

ETSI, ETSI TS 129 561 V17.9.0 (Jul. 2023), 5G; 5G System; Interworking between 5G Network and external Data Networks; Stage 3, 3GPP TS 29.561 version 17.9.0 Release 17, pp. 1-92.

Palo Alto Networks, Cortex by Palo Alto Networks, PDF Export, Online Help, retrieved Jan. 28, 2024, p. 1-69, https://docs-cortex.paloaltonetworks.com/internal/api/webapp/print/816fdf8b-4f9e-4079-8a98-235720c940ba.

3GPP, 3rd Generation Partnership Project; Technical Specification Group Services and System Aspects; Study on applicability of the zero trust security principles in mobile networks (Release 18), 3GPP TR 33.894, V18.0.0, Technical Report, Sep. 2023, pp. 1-17.

* cited by examiner

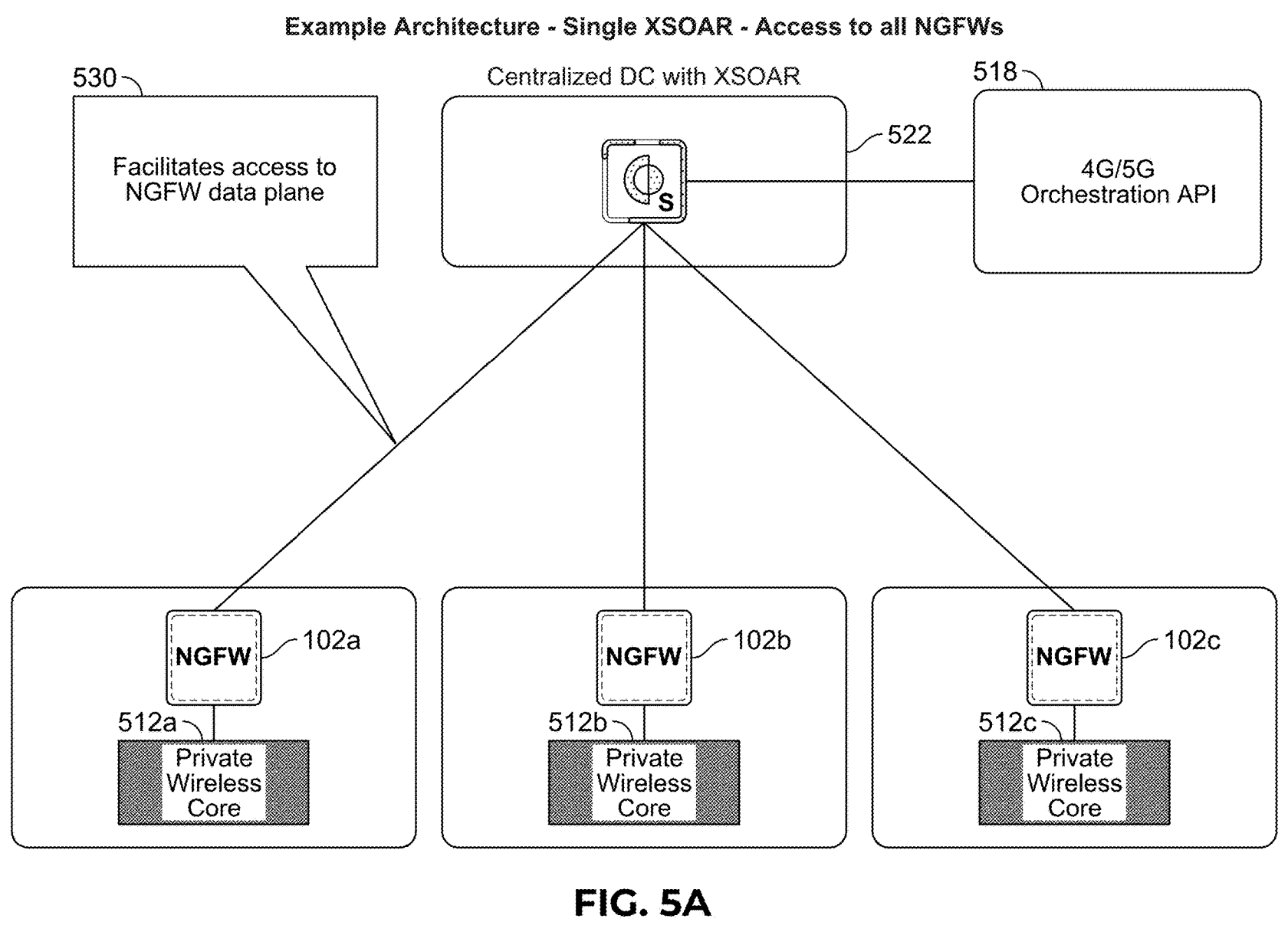

Example Architecture - Single XSOAR - Access to all NGFWs

530 Facilitates access to NGFW data plane

522 Centralized DC with XSOAR 518 4G/5G Orchestration API

102a NGFW

512a Private Wireless Core

102b NGFW

512b Private Wireless Core

102c NGFW

512c Private Wireless Core

FIG. 5A

ENABLING DEVICE CONTEXT AWARENESS, DATA INGESTION AND REAL-TIME ACTIONS IN MOBILE NETWORKS

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 5A is a functional diagram of an architecture for using APIs with a centralized data center (DC) with an XSOAR platform for providing visibility into mobile identifiers for applying security in mobile networks in accordance with some embodiments.

DETAILED DESCRIPTION

Figure 1:
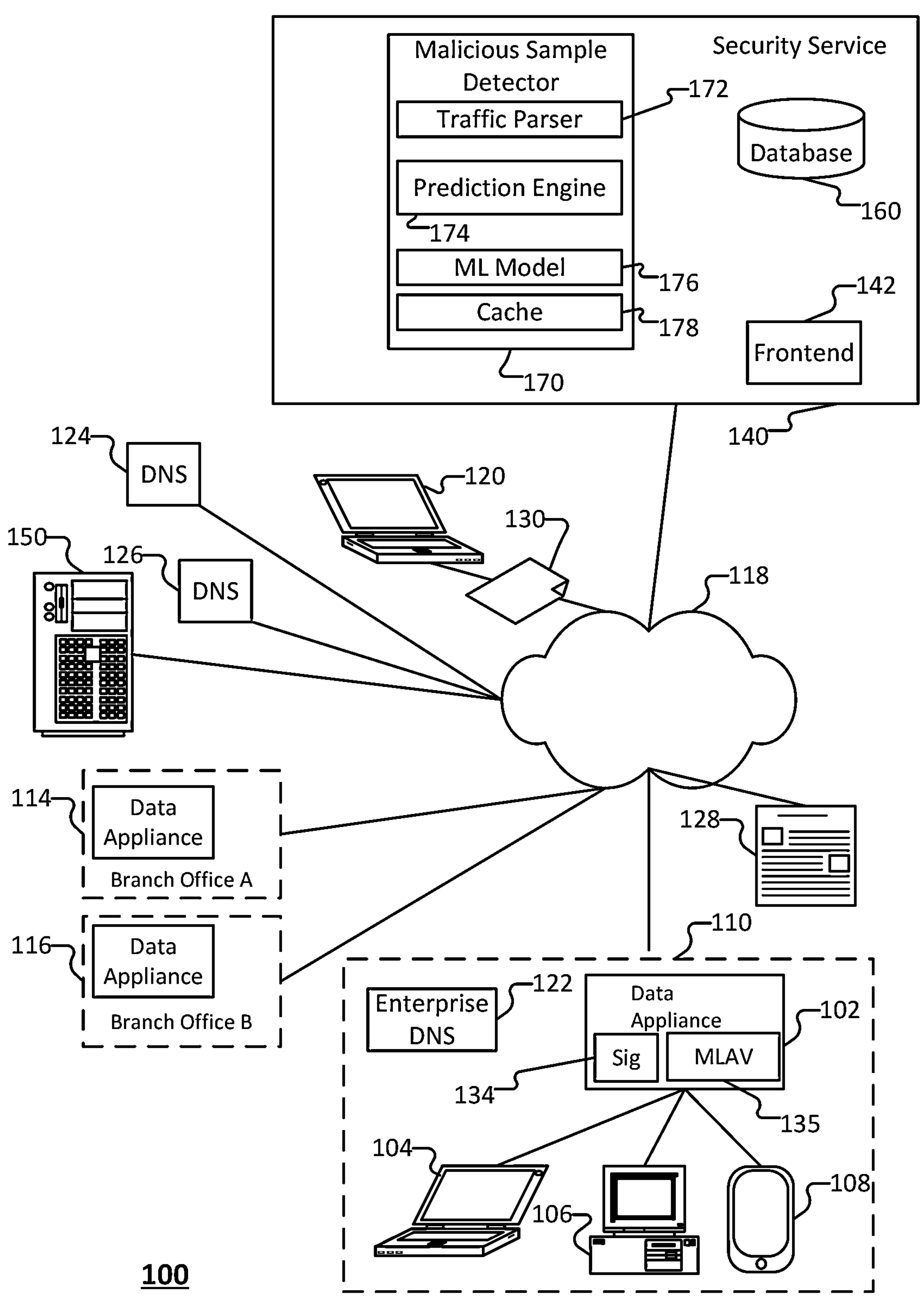
FIG. 1 is a block diagram of an environment in which malicious traffic is detected or suspected in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques.

For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets-using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls.

Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)).

For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Security Challenges for Mobile Networks

Existing mobile networks, such as 5G networks and 4G/LTE (including private and public cloud-based mobile network deployments), and future wireless technology including 6G, generally may not always expose interfaces, such as 3GPP interfaces, between network functions. This prevents deployment of security platforms (e.g., Network Gateway Firewalls (NGFWs) and/or other security entities/platforms/solutions) on these interfaces to apply context-based security to the network traffic passing through the mobile network.

Also, some mobile service providers are reluctant to deploy security platforms (e.g., NGFWs, etc.) on the mobile network interfaces (e.g., 3GPP interfaces) due to concerns over latency and service outage impacts to their mobile network traffic.

Thus, new and improved techniques are needed for improved security in mobile networks.

Overview of Techniques for Data Ingestion Enabling Context Awareness and Real-Time Actions in Mobile Networks Mobile service providers, and enterprises operating private networks, generally require the capability to combine and enrich device context data with workflows that automatically respond and remediate security incidents, policy modifications, and enforcement.

This presents various technical and security challenges for providing security solutions for mobile network environments.

For example, security providers may not have access to signaling traffic in mobile networks (e.g., in core 4G/5G/6G mobile networks and other future cellular/mobile networking technologies). Also, private wireless networks are often closed, and as such, signaling traffic may also not be accessible for security providers.

As such, security platforms/entities/services may not always have visibility into devices in these mobile network environments. As such, it is technically challenging to provide zero trust in such mobile network environments as context information is typically not visible for the above-discussed reasons.

Accordingly, new and improved techniques for data ingestion enabling context awareness and real-time actions in mobile networks are disclosed.

Specifically, the disclosed techniques include using Application Programming Interfaces (APIs) and a packet generator to apply context-based security in mobile networks.

In some embodiments, a system, a process, and/or a computer program product for data ingestion enabling context awareness and real-time actions in mobile networks includes extracting a plurality of parameters from a mobile core network entity using application programming interface (API) calls, messages over a message broker, and/or logs from the mobile core network entity; determining a context for a session using one or more of the plurality of parameters associated with a mobile device communicating over the mobile core network; and applying a security policy using a security platform to the session based on the context.

For example, the use of APIs and custom logic can be applied to alter private wireless and UE states (e.g., disconnect a UE from a private wireless network, etc.).

As another example, the use of APIs and mobile network context can be applied for device entity and attribute enrichment.

Yet another example, the use of APIs and mobile network context can be applied to autonomously trigger actions and workflows to multiple network and security systems.

Moreover, the disclosed techniques for data ingestion enabling context awareness and real-time actions in mobile networks generally do not require changes from the mobile service provider vendors (e.g., Ericsson, Nokia, etc.) in how their core mobile network devices and software operate or are configured/deployed.

Further, the disclosed techniques for data ingestion enabling context awareness and real-time actions in mobile networks generally require no change of the enterprise or customer deploying a (private) mobile network. The disclosed techniques collect and receive various input from existing data sources and apply the data (e.g., contextual information) to inform security platforms (e.g., a NGFW or other security entities/platforms/services) with additional context, new rules, new device groups, etc., security policies, network slices or zones, including, for example, directly updating the core mobile network infrastructure.

These and other embodiments for data ingestion enabling context awareness and real-time actions in mobile networks will now be further described below.

System Embodiments for Data Ingestion Enabling Context Awareness and Real-Time Actions in Mobile Networks FIG. 1 is a block diagram of an environment in which malicious traffic is detected or suspected in accordance with some embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is a security platform, also referred to herein as an inline security entity. Data appliance 102 performs low-latency processing/analysis of incoming data (e.g., traffic data) and determines whether to offload any processing of the incoming data to a cloud system, such as security service 140 (e.g., which includes a frontend 142, such as for communications with security platforms, such as data appliance 102, etc.).

Techniques described herein can be used in conjunction with a variety of platforms (e.g., desktops, mobile devices, gaming platforms, embedded systems, etc.) and/or a variety of types of applications (e.g., Android.apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security service 140 (e.g., a cloud-based security service, also referred to as a cloud service or a cloud security service). Security service 140 may be a cloud system such as a cloud service security entity. Security service 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security service 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security service 140 can be implemented across a scalable infrastructure comprising multiple such servers, solid state drives, and/or other applicable high-performance hardware. Security service 140 can comprise several distributed components, including components provided by one or more third parties. For example, portions or all of security service 140 can be implemented using the Amazon Elastic Compute Cloud (EC2) and/or Amazon Simple Storage Service (S3). Further, as with data appliance 102, whenever security service 140 is referred to as performing a task, such as storing data or processing data, it is to be understood that a sub-component or multiple sub-components of security service 140 (whether individually or in cooperation with third party components) may cooperate to perform that task. As one example, security service 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security service 140 but may also be provided by a third party. As one example, the virtual machine server can rely on EC2, with the remainder portions of security service 140 provided by dedicated hardware owned by and under the control of the operator of security service 140.

In some embodiments, system 100 (e.g., malicious sample detector 170, security service 140, etc.) trains a detection model to detect exploits (e.g., malicious samples), malicious traffic, and/or other malicious/nefarious/undesirable activity/behavior, etc. Security service 140 may store block lists, allowed lists, etc. with respect to data (e.g., mappings of signatures to malicious files, etc.). In response to processing traffic data, security service 140 may send an update to inline security entities, such as data appliance 102. For example, security service 140 provides an update to a mapping of signatures to malicious files, an update to a mapping of signatures to benign files, etc.

According to various embodiments, the model(s) trained by system 100 (e.g., security service 140) are obtained using a machine learning process (e.g., implementing various machine learning techniques (MLT)). Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) are a combined feature vector or set of feature vectors and based on the combined feature vector or set of feature vectors the classifier model determines whether the corresponding traffic (e.g., input string) is malicious, or a likelihood that the traffic is malicious (e.g., whether the traffic is exploit traffic).

According to various embodiments, security service 140 includes a malicious sample detector 170. Malicious sample detector 170 is used in connection with determining whether a sample (e.g., traffic data) is malicious. In response to receiving a sample (e.g., an input string such as an input string input in connection with a log-in attempt), malicious sample detector 170 analyzes the sample (e.g., the input string), and determines whether the sample is malicious. For example, malicious sample detector 170 determines one or more feature vectors for the sample (e.g., a combined feature vector), and uses a model to determine (e.g., predict) whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, ML model 176, and/or cache 178.

Traffic parser 172 is used in connection with determining (e.g., isolating) one or more attributes associated with a sample being analyzed. As an example, in the case of a file, traffic parser 172 can parse/extract information from the file, such as from a header of the file. The information obtained from the file may include libraries, functions, or files invoked/called by the file being analyzed, an order of calls, etc. As another example, in the case of an input string, traffic parser 172 determines sets of alphanumeric characters or values associated with the input string. In some embodiments, traffic parser 172 obtains one or more attributes associated with (e.g., from) the input string. For example, traffic parser 172 obtains from the input string one or more patterns (e.g., a pattern of alphanumeric characters), one or more sets of alphanumeric characters, one or more commands, one or more pointers or links, one or more IP addresses, etc.

In some embodiments, one or more feature vectors corresponding to the input string are determined by malicious sample detector 170 (e.g., traffic parser 172 or prediction engine 174). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, traffic parser 172 uses the one or more attributes associated with the sample in connection with determining the one or more feature vectors. In some implementations, traffic parser 172 determines a combined feature vector based at least in part on the one or more feature vectors corresponding to the sample. As an example, a set of one or more feature vectors is determined (e.g., set or defined) based at least in part on the model used to detect exploits. Malicious sample detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from files, or SQL and command injection strings, and (ii) using an algorithmic-based feature extraction to filter out described features from a set of raw input data.

In response to receiving a sample for which malicious sample detector 170 is to determine whether the sample is malicious (or a likelihood that the sample is malicious), malicious sample detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious sample detector 170 (e.g., traffic parser 172) provides (or makes accessible) the one or more feature vectors to prediction engine 174 (e.g., in connection with obtaining a prediction of whether the sample is malicious). As another example, malicious sample detector 170 (e.g., traffic parser 172) stores the one or more feature vectors such as in cache 178 or database 160.

In some embodiments, prediction engine 174 determines whether the sample is malicious based at least in part on one or more of (i) a mapping of samples to indications of whether the corresponding samples are malicious, (ii) a mapping of an identifier for a sample (e.g., a hash or other signature associated with the sample) to indications of whether the corresponding sample is malicious, and/or (iii) a classifier (e.g., a model trained using a machine learning process). In some embodiments, determining whether the sample based on identifiers to indications that the sample is malicious may be performed at data appliance 102, and for a sample for which an associated identifier is not stored in the mapping(s), data appliance 102 offloads processing of the sample to security service 140.

Prediction engine 174 is used to predict whether a sample is malicious. In some embodiments, prediction engine 174 determines (e.g., predicts) whether a received sample is malicious. According to various embodiments, prediction engine 174 determines whether a newly received sample is malicious based at least in part on characteristics/attributes pertaining to the sample (e.g., regex statements, information obtained from a file header, calls to libraries, APIs, etc.). For example, prediction engine 174 applies a machine learning model to determine whether the newly received sample is malicious. Applying the machine learning model to determine whether the sample is malicious may include prediction engine 174 querying machine learning model 176 (e.g., with information pertaining to the sample, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular sample is malicious. In some embodiments, prediction engine 174 receives information associated with whether the sample is malicious (e.g., an indication that the sample is malicious). For example, prediction engine 174 receives a result of a determination or analysis by machine learning model 176. In some embodiments, prediction engine 174 receives from machine learning model 176 an indication of a likelihood that the sample is malicious. In response to receiving the indication of the likelihood that the sample is malicious, prediction engine 174 determines (e.g., predicts) whether the sample is malicious based at least in part on the likelihood that the sample is malicious. For example, prediction engine 174 compares the likelihood that the sample is malicious to a likelihood threshold value. In response to a determination that the likelihood that the sample is malicious is greater than a likelihood threshold value, prediction engine 174 may deem (e.g., determine that) the sample to be malicious.

According to various embodiments, in response to prediction engine 174 determining that the received sample is malicious, security service 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a block list of samples (e.g., corresponding to malicious samples) such as in the case that the received sample is deemed to be malicious, or an update to an allowed list of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for a sample and perform a look up against a mapping of hashes/signatures to indications of whether samples are malicious/benign (e.g., query an allow list and/or a block list). In some embodiments, the hash or signature uniquely identifies the sample.

Prediction engine 174 is used in connection with determining whether the sample (e.g., an input string) is malicious (e.g., determining a likelihood or prediction of whether the sample is malicious). Prediction engine 174 uses information pertaining to the sample (e.g., one or more attributes, patterns, etc.) in connection with determining whether the corresponding sample is malicious.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a block list, an allow list, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical input strings and historical information, malicious sample detector 170 may deem the sample has not yet been analyzed and malicious sample detector 170 can invoke an analysis (e.g., a dynamic analysis) of the sample in connection with determining (e.g., predicting) whether the sample is malicious (e.g., malicious sample detector 170 can query a classifier based on the sample in connection with determining whether the sample is malicious). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on an allow list or block list, etc.). Malicious sample detector 170 (e.g., traffic parser 172) may detect that a sample is newly analyzed in response to security service 140 receiving the sample from a security entity (e.g., a firewall) or endpoint within a network. For example, malicious sample detector 170 determines that a sample is newly analyzed contemporaneous with receipt of the sample by security service 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to query a classifier to analyze the sample or one or more feature vectors associated with the sample, etc.) in connection with determining whether the sample is malicious, and malicious sample detector 170 uses a classifier with respect to a set of feature vectors or a combined feature vector associated with characteristics or relationships of attributes or characteristics in the sample.

Machine learning model 176 predicts whether a sample (e.g., a newly received sample) is malicious based at least in part on a model. As an example, the model is pre-stored and/or pre-trained. The model can be trained using various machine learning processes. According to various embodiments, machine learning model 176 uses a relationship and/or pattern of attributes and/or characteristics, relationships among attributes or characteristics for the sample, and/or a training set to estimate whether the sample is malicious, such as to predict a likelihood that the sample is malicious. For example, machine learning model 176 uses a machine learning process to analyze a set of relationships between an indication of whether a sample is malicious (or benign), and one or more attributes pertaining to the sample and uses the set of relationships to generate a prediction model for predicting whether a particular sample is malicious. In some embodiments, in response to predicting that a particular sample is malicious, an association between the sample and the indication that the sample is malicious is stored such as at malicious sample detector 170 (e.g., cache 178). In some embodiments, in response to predicting a likelihood that a particular sample is malicious, an association between the sample and the likelihood that the sample is malicious is stored such as at malicious sample detector 170 (e.g., cache 178). Machine learning model 176 may provide the indication of whether a sample is malicious, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

Cache 178 stores information pertaining to a sample (e.g., an input string). In some embodiments, cache 178 stores mappings of indications of whether an input string is malicious (or likely malicious) to particular input strings, or mappings of indications of whether a sample is malicious (or likely malicious) to hashes or signatures corresponding to samples. Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C & C) server 150, as well as to receive instructions from C & C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104, will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C & C server 150, client device 104 will need to resolve the domain, "kj32hkjqfeuo32ylhkjshdflu23.badsite.com," to a corresponding Internet Protocol (IP) address. In this example, malicious DNS server 126 is authoritative for * badsite.com and client device 104's request will be forwarded (for example) to DNS server 126 to resolve, ultimately allowing C & C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security service 140.

In various embodiments, data appliance 102 includes signatures 134 (e.g., periodically updated from security service 140) and an inline machine learning antivirus (MLAV) module 135, which is configured to facilitate ML-based malware detection (e.g., the MLAV model component can be implemented as further described in U.S. Pat. Nos. 11,374,946 and 11,636,208, which are both incorporated herein by reference in their entirety). Using processing described in more detail below, security service 140 will determine (e.g., using a malicious file detector that may be similar to malicious sample detector 170 such as by using a machine learning model to detect/predict whether the file is malicious) whether a sample (e.g., a file) is a malicious file (or likely to be a malicious file) and provide a result back to data appliance 102 (e.g., "malicious file" or "benign file").

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and the data appliance may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

Figure 2A:
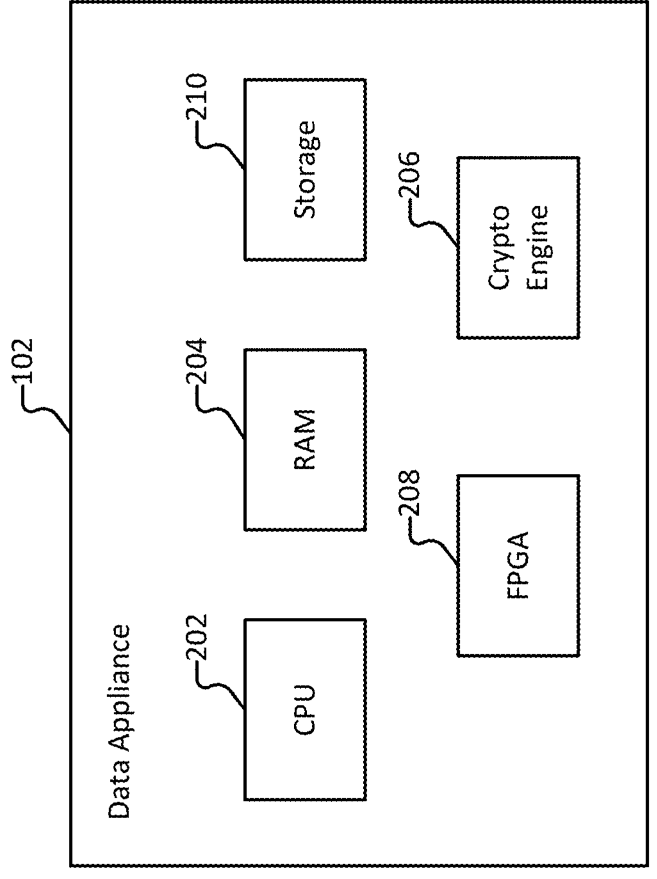
FIG. 2A illustrates an embodiment of a data appliance.

FIG. 2A illustrates an embodiment of a data appliance. An embodiment of an inline security entity, such as data appliance 102, is shown in FIG. 2A. The example shown is a representation of physical components that are included in data appliance 102, in various embodiments. Specifically, data appliance 102 includes a high-performance multi-core Central Processing Unit (CPU) 202 and Random Access Memory (RAM) 204. Data appliance 102 also includes a storage 210 (such as one or more hard disks or solid-state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general-purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

Figure 2B:
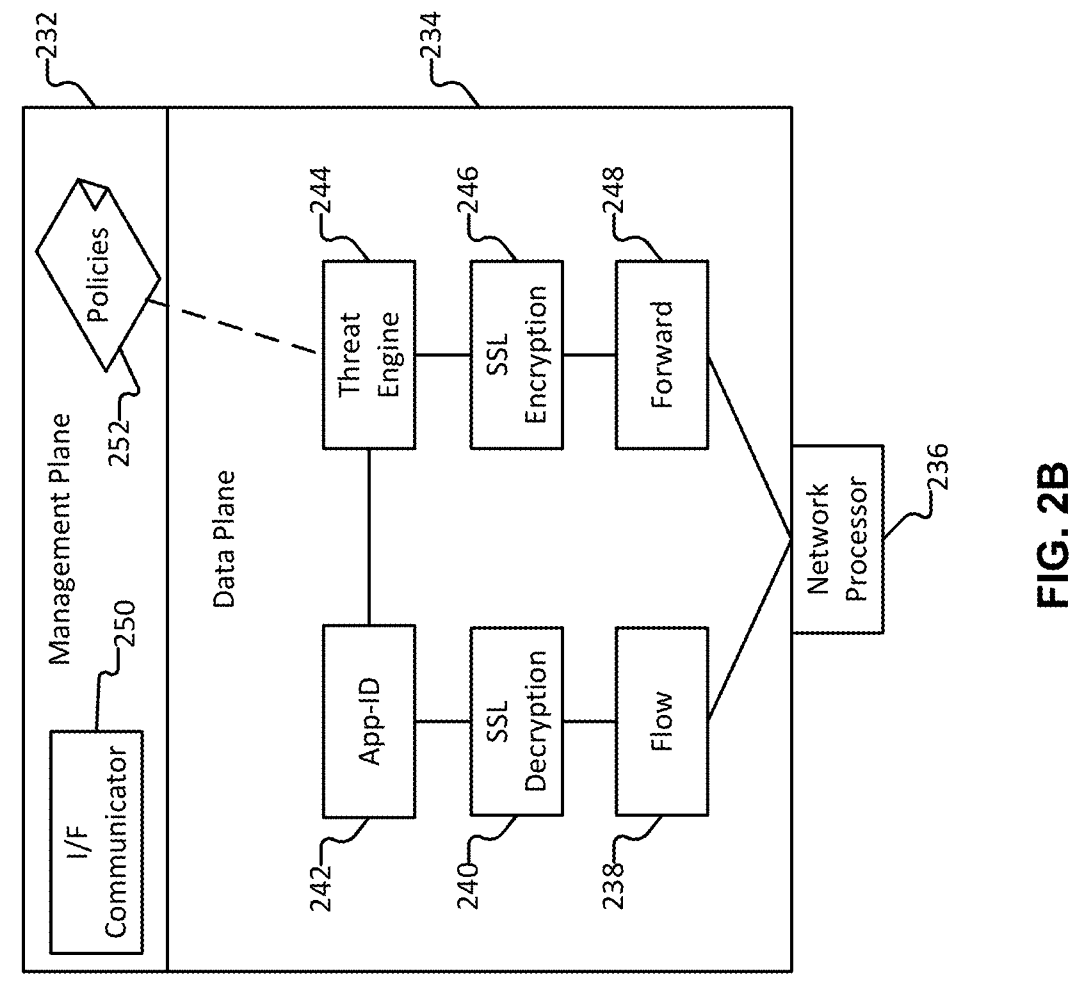
FIG. 2B is a functional diagram of logical components of an embodiment of a data appliance.

FIG. 2B is a functional diagram of logical components of an embodiment of a data appliance. The example shown is a representation of logical components that can be included in an inline security appliance, such as data appliance 102, in various embodiments. Unless otherwise specified, various logical components of data appliance 102 are generally implementable in a variety of ways, including as a set of one or more scripts (e.g., written in Go, Java, Python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling. The data plane may be further responsible for offloading processing to a cloud system/service, such as by communicating a request message to the cloud system/service without mediation or forwarding the message through the management plane, such as further described herein.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

Data Ingestion Enabling Context Awareness and Real-Time Actions in Mobile Networks Various system embodiments for data ingestion enabling context awareness and real-time actions in mobile networks are disclosed as will now be further described below.

For example, a private wireless architecture can be used with mobile identifier visibility (e.g., IMSI, IMEI, and/or other contextual information based on these or other mobile identifiers). However, the private packet core of typical mobile networks is typically "closed." When the security platform (e.g., NGFW or other security entity/platform/service) has inline or tapped visibility of control plane (e.g., GTP-C or PFCP) traffic in a 4G or 5G private network, then it can learn these identifiers and the IP addresses mapped to each one. In some cases, access to observe this control plane traffic is not available/an option, and APIs or additional protocols or data and network acquisition technologies can be used as an alternative mechanism for providing visibility into these identifiers, such as will be further described below.

Because the APIs and data acquisition techniques are different for each packet core vendor, the solution can be implemented to synchronize and enrich the data utilizing middleware to normalize the device contextual data to be sent to firewalls and/or to other technologies. Data synchronization and state can be maintained by the middleware to keep track of which devices are on the network and which are not as well as any changes such as the IP address used by that IP, network related and device related information and/or other contextual information as desired/needed.

For this solution, due to its flexibility and the fact it is a Palo Alto Networks product, Cortex XSOAR was selected as the middleware. New cases or modifications to existing integrations were developed to interact with the packet core vendor APIs. The nature of the work done on XSOAR for each packet core vendor will be described in more detail below.

Figure 3A:
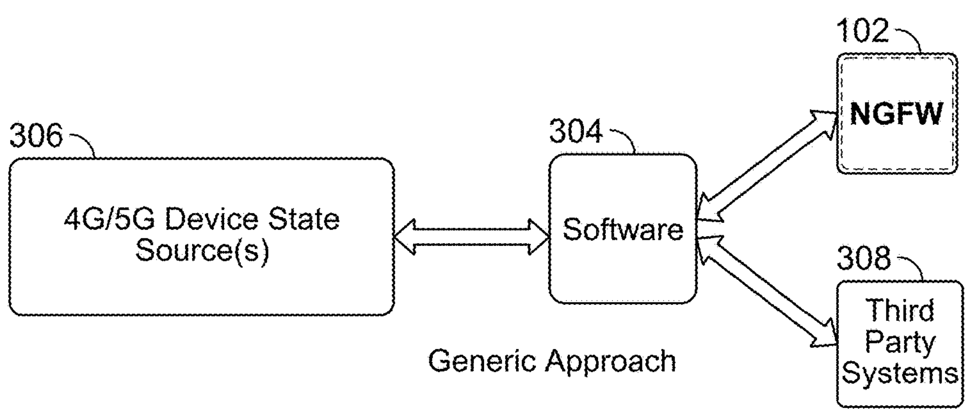
FIG. 3A is a high-level component diagram for using APIs for providing visibility into mobile identifiers for applying security in mobile networks in accordance with some embodiments.

FIG. 3A is a high-level component diagram for using APIs for providing visibility into mobile identifiers for applying security in mobile networks in accordance with some embodiments. At a high level, the components of this solution, and how they interact, are shown in FIG. 3A.

Referring to FIG. 3A, a generic approach is illustrated that utilizes a software component 304 to communicate with sources of 4G/5G device state/information 306 (e.g., contextual information associated with such devices, such as IMEI, IMSI, and/or other mobile device identifiers or contextual information). Software 304 then communicates the 4G/5G device state/contextual information to a security entity/platform/service, shown as NGFW 102 in this example implementation. The 4G/5G device state/contextual information can similarly be shared/communicated with other third-party systems/services 308.

Figure 3B:
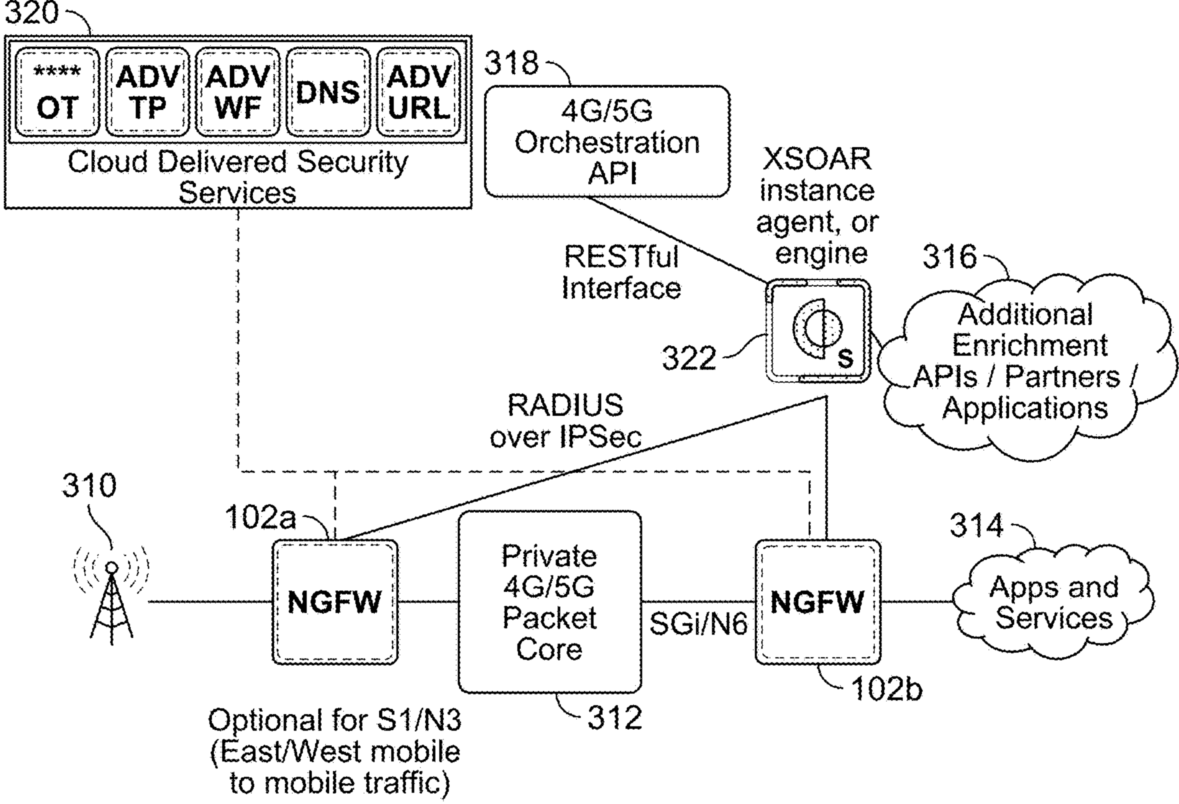
FIG. 3B is a functional diagram of an architecture for using APIs and other protocols for providing visibility into mobile identifiers for applying security in mobile networks in accordance with some embodiments.

FIG. 3B is a functional diagram of an architecture for using APIs and other protocols for providing visibility into mobile identifiers for applying security in mobile networks in accordance with some embodiments. As shown, a mobile network includes a private 4G/5G packet core mobile network 312 and 4G/5G cellular communication equipment 310. Security platforms, NGFWs 102*a*, and 102*b* are located outside of the private 4G/5G packet core mobile network as shown in FIG. 3B.

In an example implementation, XSOAR (e.g., XSOAR is a Security Orchestration, Automation, and Response (SOAR) platform, which adds several features, including integrated machine learning, threat intelligence, and analytics, as well as improved automation and orchestration capabilities) and custom integrations are used to address the above-described technical challenges for enhanced mobile network security (e.g., security for devices on mobile networks based on contextual information, such as mobile device identifiers). Referring to FIG. 3B, an XSOAR engine 322 (e.g., implemented as an XSOAR instance engine or) can interface with private wireless vendor's APIs to retrieve/receive device context as shown at 316. The device's contextual information can then be stored as indicators in XSOAR. XSOAR engine 322 is also in communication with a 4G/5G Orchestration API 318 using a RESTful interface (e.g., REST API(s)) as an example but can use any network protocol for communication.

As also shown in FIG. 3B, XSOAR engine 322 is configured to push this context information towards other elements, such as security platforms, shown as NGFW 102*a* and NGFW 102*b*. The communication between the XSOAR engine and the security platforms can be performed over various protocols and communication mechanisms (e.g., RADIUS is shown as an example protocol, but other existing or future protocols can similarly be used as would be apparent to one of ordinary skill in the art in view of the disclosed embodiments), such as but not limited to message busses, APIs, signaling protocols, etc. Example contextual information includes mobile device identifiers IMEI, IMSI, and/or other contextual information (e.g., IP address, ICCID, RAT, APN, DN, QoS parameters, PLMNID, radio ID (e.g., gNodeB ID), UE State (Connected, Disconnected, Idle, etc.). As such, session traffic can be monitored and security policies/rules applied to the session traffic based on contextual information, including for session traffic accessing various apps and services, such as shown at 314.

As also shown, security platforms, shown as NGFW 102*a* and NGFW 102*b*, are in secure communication with a cloud security service 320. For example, the cloud security service can periodically provide updated security information (e.g., malware classification/detection machine learning trained models, heuristics, signatures, URL allow/block lists, etc.) to the security platforms. Also, the security platforms can upload malware samples to the cloud security service for offline (e.g., rather than just inline) security analysis.

As will be further described below, the disclosed techniques for data ingestion enabling context awareness and real-time actions in mobile networks can be implemented for a single customer or many customers (e.g., multi-tenant).

Figure 4:
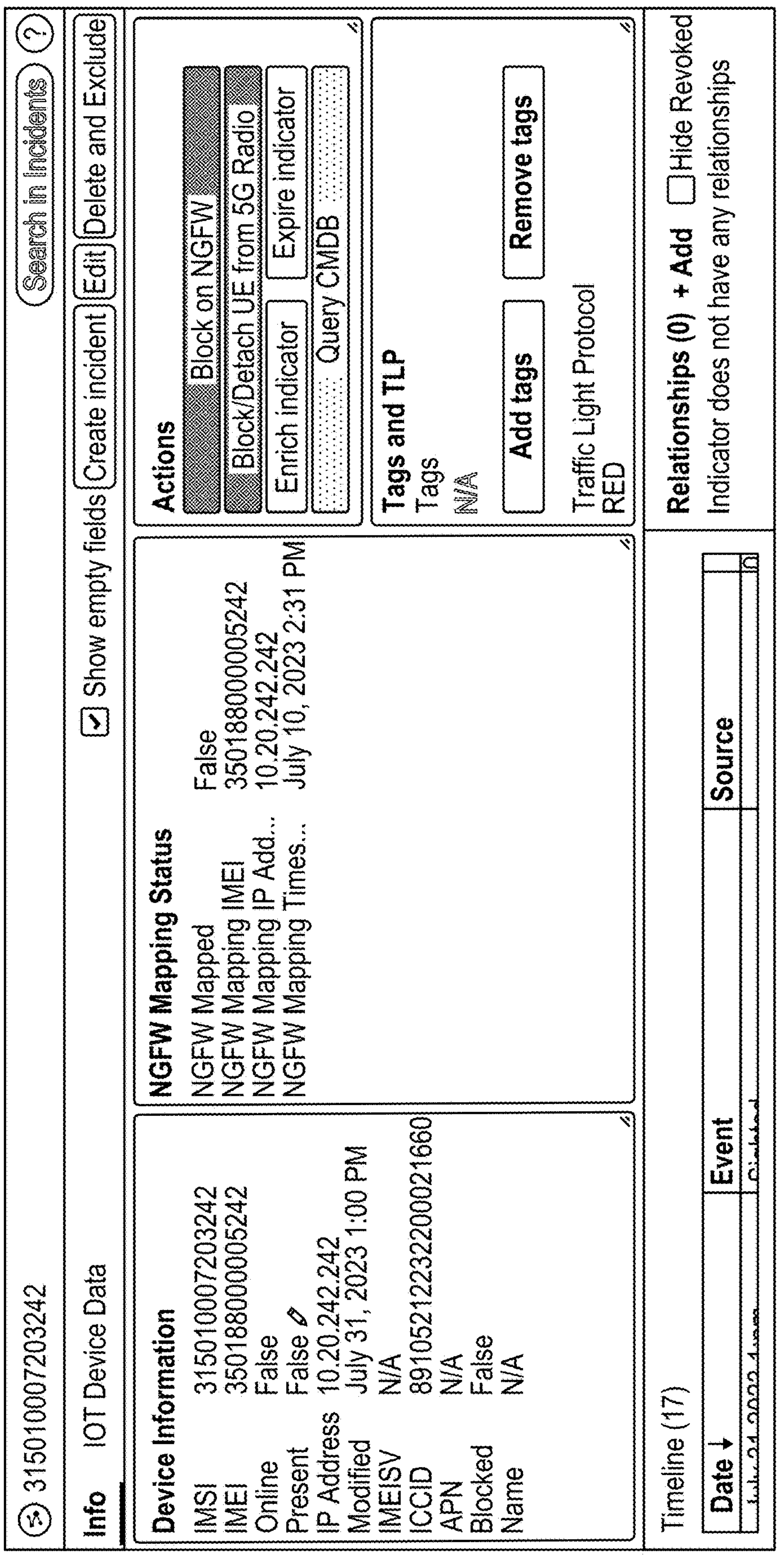
FIG. 4 is a diagram of a graphical user interface for using APIs for providing visibility into mobile identifiers for applying security in a 5G mobile network in accordance with some embodiments.

FIG. 4 is a diagram of a graphical user interface for using APIs for providing visibility into mobile identifiers for applying security in a 5G mobile network in accordance with some embodiments. Referring to FIG. 4, as 5G devices are added to the 5G core networks, the 5G devices are automatically synchronized with the XSOAR platform (e.g., such as the XSOAR platform 322 as shown in FIG. 3B) utilizing multiple APIs, protocols, and/or processes (e.g., such as using various XSOAR/other APIs and the RADIUS over IPSEC protocols, and/or using other protocols and APIs as described above with respect to FIG. 3B). When new 5G devices are added or modified, the device context and attributes (e.g., generally referred to herein as device context and/or contextual information) are dynamic and updated from various different sources, such as similarly described above with respect to FIG. 3B. As such, the disclosed techniques facilitate providing a centralized point of reference for 5G device related contextual information to facilitate enhanced security in mobile networks.

In this example implementation, the disclosed techniques for using APIs for providing visibility into mobile identifiers for applying security in mobile networks can:

(1) be added and modified at any time and have a historical reference and timeline;
(2) be updated or synchronized from multiple sources, APIs, and third-party applications and products;
(3) can trigger workflows/security playbooks automatically (e.g., in response to changes/updates to device context information);
(4) can enrich security incidents from any source if an IMEI or a match of specific indicator attributes is found;
(5) can synchronize with third-party configuration management databases (CMDBs);
(6) can be customized for the end user including graphical widgets, data aggregation, and customized views;
(7) can be streamed or forwarded into other systems/services (e.g., as similarly described above and shown in FIG. 3B);
(8) can have associated and linked relationships between devices (e.g., 5G devices);
(9) can have associated security or related incidents;
(10) can be tagged for grouping or classification;
(11) can provide status of device such as online or offline, provisioned, and other attributes;
(12) can provide last location, access point, and device related information; and/or
(13) can have manual actions that trigger automated actions and workflows.

Single Tenant Architecture Embodiments for Data Ingestion Enabling Context Awareness and Real-Time Actions in Mobile Networks FIG. 5A is a functional diagram of an architecture for using APIs with a centralized data center (DC) with an XSOAR platform for providing visibility into mobile identifiers for applying security in mobile networks in accordance with some embodiments. As shown, a plurality of distinct mobile networks includes private 4G/5G packet core mobile networks 512*a*, 512*b*, and 512*c*. Security platforms, NGFWs 102*a*, 102*b*, and 102*c* are located outside of the private 4G/5G packet core mobile networks as shown in FIG. 5A.

In an example implementation, XSOAR (e.g., XSOAR provides an example technology for Security Orchestration, Automation, and Response (SOAR), which includes several features, including integrated machine learning, threat intelligence, and analytics, as well as improved automation and orchestration capabilities) and custom integrations are used to address the above-described technical challenges for enhanced mobile network security (e.g., security for devices on mobile networks based on contextual information, such as mobile device identifiers). Referring to FIG. 5A, an XSOAR server uses a distributed XSOAR runtime engine 522 (e.g., implemented as an XSOAR runtime engine for execution of a distributed compute and runtime environment with the XSOAR server as shown in FIG. 5A) is in communication with NGFWs 102*a*, 102*b*, and 102*c* as shown, for example at 530, to facilitate access to the data plane of the security platforms. The device's contextual information can then be stored as indicators in XSOAR. XSOAR engine 522 is also in communication with a 4G/5G core API 518 using, for example, a RESTful interface (e.g., REST API(s), and connecting to an XSOAR server over secure web sockets to stream data or code for execution, such as similarly described above with respect to FIG. 3B).

In this example implementation of a single/centralized XSOAR platform with access to all security platforms (e.g., NGFWs 102*a*, 102*b*, and 102*c*), XSOAR engine 522 is configured to push this context information towards other elements, such as security platforms, shown as NGFW 102*a* (e.g., such as shown at 530), NGFW 102*b*, and NGFW 102*c*. For example, communications between the XSOAR server security platforms can be performed using XSOAR engines or directly from the server via using XSOAR engines or directly from the server via RADIUS over IPSEC protocols (e.g., and/or using other protocols and APIs), such as similarly described above with respect to FIG. 3B. Example contextual information includes mobile device identifiers IMEI, IMSI, and/or other contextual information (e.g., IP address, ICCID, RAT, APN, DN, QoS parameters, PLMNID, radio ID (e.g., gNodeB ID), UE State (Connected, Disconnected, Idle, etc.).

As similarly described above with respect to FIG. 3B, security platforms, shown as NGFW 102*a*, NGFW 102*b*, and NGFW 102*c*, can also be in secure communication with a cloud security service (not shown in FIG. 5A) or distributed environments. For example, the cloud security service can periodically provide updated security information (e.g., malware classification/detection machine learning trained models, heuristics, signatures, URL allow/block lists, etc.) to the security platform or additional device related attributes. Also, the XSOAR or additional security platform can upload device heuristics, malware samples, or other file related information to the cloud security service for real-time and/or offline security analysis.

Figure 5B:
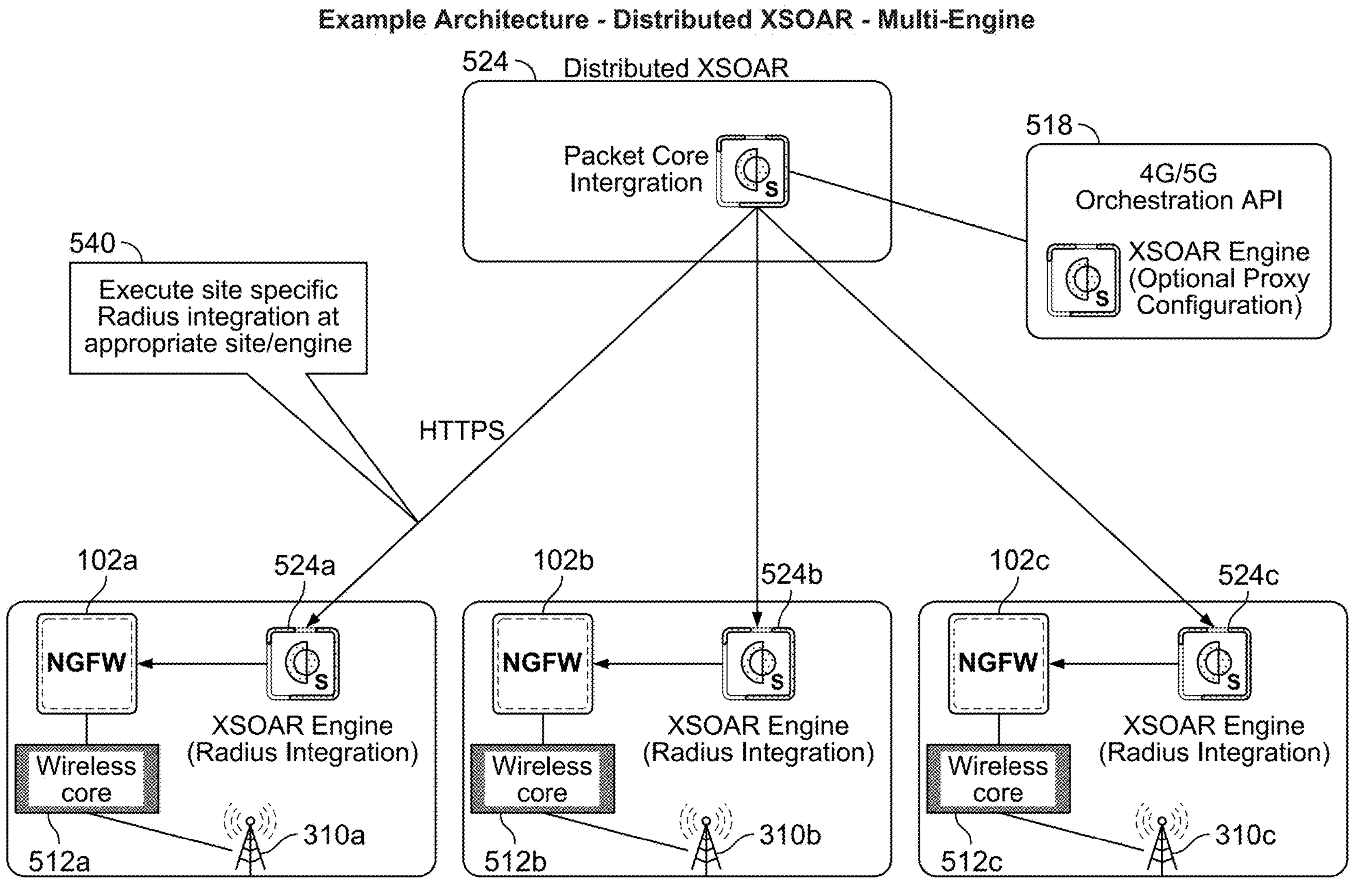
FIG. 5B is a functional diagram of an architecture for using APIs with a distributed XSOAR server platform with a distributed multi code execution and runtime engine a distributed multi code execution and run time engine platform for providing visibility into mobile identifiers for applying security in mobile networks in accordance with some embodiments.

FIG. 5B is a functional diagram of an architecture for using APIs with a distributed XSOAR server platform with a distributed multi code execution and runtime engine a distributed multi code execution and run time engine platform for providing visibility into mobile identifiers for applying security in mobile networks in accordance with some embodiments. As shown, a plurality of distinct mobile networks includes private 4G/5G packet core mobile networks 512*a*, 512*b*, and 512*c* in communication with 4G/5G cellular communication equipment 310*a*, 310*b*, and 310*c*, respectively. Security platforms, NGFWs 102*a*, 102*b*, and 102*c* are located outside of the private 4G/5G packet core mobile networks as shown in FIG. 5B.

In an example implementation, XSOAR (e.g., a Security Orchestration, Automation, and Response (SOAR) platform, adds several features, including integrated machine learning, threat intelligence, and analytics, as well as improved automation and orchestration capabilities) and custom integrations are used to address the above-described technical challenges for enhanced mobile network security (e.g., security for devices on mobile networks based on contextual information, such as mobile device identifiers). Referring to FIG. 5B, an XSOAR engine 524 (e.g., implemented as an XSOAR instance agent for providing a distributed XSOAR platform as shown in FIG. 5B) is in communication with XSOAR engines 524*a*, 524*b*, and 524*c* via Radius protocol integration (e.g., implemented as an XSOAR instance agent for providing a distributed, multi-engine XSOAR implementation as shown in FIG. 5B). In this example implementation, as shown at 540, the XSOAR distributed, multi-engine code execution runtime implementation facilitates executing site specific Radius integration at the appropriate site/engine over the HTTPS protocol (e.g., between distributed XSOAR 524 and each of the XSOAR engines 524*a*, 524*b*, and 524*c*). The device's contextual information can then be stored as indicators in the XSOAR platform. XSOAR engine 524 is also in communication with a 4G/5G wireless platform vendor API 518 using, for example, a RESTful interface (e.g., REST API(s), such as similarly described above with respect to FIG. 3B).

In this example implementation of a distributed, multi-engine XSOAR platform with access to all security platforms (e.g., NGFWs 102*a*, 102*b*, and 102*c*), XSOAR engine 522 is configured to push the device context and attribute information towards other elements, such as each of the XSOAR engines 524*a* (e.g., such as shown at 540), 524*b*, and 524*c*. For example, the communication between the XSOAR engine and the XSOAR engines 524*a*, 524*b*, and 524*c* can be performed via RADIUS (e.g., as an example protocol, various other protocols and/or APIs can similarly be used to implement the disclosed techniques), such as similarly described above with respect to FIG. 3B. Example contextual information includes mobile device identifiers IMEI, IMSI, and/or other contextual information (e.g., IP address, ICCID, RAT, APN, DN, QoS parameters, PLMNID, radio ID (e.g., gNodeB ID), UE State (Connected, Disconnected, Idle, etc.).

As similarly described above with respect to FIG. 3B, security platforms, shown as NGFW 102*a*, NGFW 102*b*, and NGFW 102*c*, can also be in secure communication with a cloud security service (not shown in FIG. 5B). For example, the cloud security service can periodically provide updated security information (e.g., malware classification/detection machine learning trained models, heuristics, signatures, URL allow/block lists, etc.) to the security platforms. Also, the security platforms can upload malware samples to the cloud security service for offline (e.g., rather than just inline) security analysis.

Example embodiments for providing a multi-tenant distributed architecture for data ingestion enabling context awareness and real-time actions in mobile networks will now be further described below.

Figure 6:
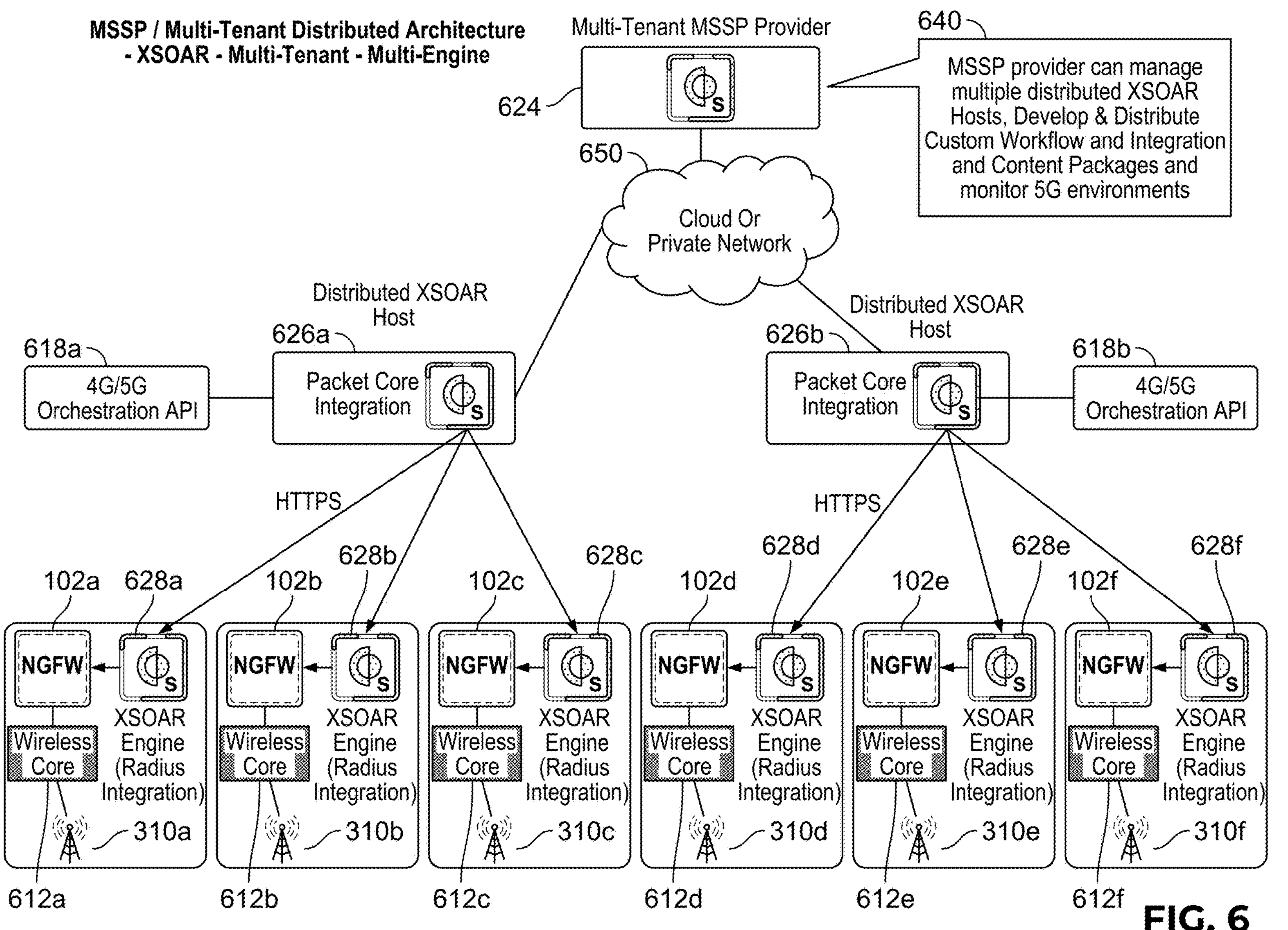
FIG. 6 is a functional diagram of an architecture for using APIs with a multi-tenant distributed XSOAR multi-engine platform for providing visibility into mobile identifiers for applying security in mobile networks in accordance with some embodiments.

Multi-Tenant Distributed Architecture Embodiments for Data Ingestion Enabling Context Awareness and Real-Time Actions in Mobile Networks FIG. 6 is a functional diagram of an architecture for using APIs with a multi-tenant distributed XSOAR multi-engine platform for providing visibility into mobile identifiers for applying security in mobile networks in accordance with some embodiments. As shown, a plurality of distinct mobile networks includes private 4G/5G packet core mobile networks 612*a*, 612*b*, 612*c*, 612*d*, 612*e*, and 612*f* in communication with 4G/5G cellular communication equipment 310*a*, 310*b*, 310*c*, 310*d*, 310*e*, and 310*f*, respectively. Security platforms, NGFWs 102*a*, 102*b*, 102*c*, 102*d*, 102*e*, and 102*f* are located outside of the private 4G/5G packet core mobile networks as shown in FIG. 6.

In an example implementation, XSOAR (e.g., XSOAR is a newer and more comprehensive version of Security Orchestration, Automation, and Response (SOAR) that is commercially available from Palo Alto Networks, Inc., headquartered in Santa Clara, CA, which adds several features, including integrated machine learning, threat intelligence, and analytics, as well as improved automation and orchestration capabilities; other SOAR platforms or other types of broker systems/solutions or message bus implementations that are capable of integrations with multiple systems that use a workflow system can similarly be used as would now be apparent to one of ordinary skill in the art in view of the disclosed embodiments) and custom integrations are used to address the above-described technical challenges for enhanced mobile network security (e.g., security for devices on mobile networks based on contextual information, such as mobile device identifiers). Referring to FIG. 6, an XSOAR engine 624 (e.g., implemented as an XSOAR instance agent for providing a multi-tenant, managed security service provider (MSSP) XSOAR platform as shown in FIG. 6) is in communication with distributed XSOAR hosts 626*a* and 626*b* via a cloud or private network 650 (e.g., implemented as an XSOAR instance agent for providing an MSSP/multi-tenant XSOAR implementation as shown in FIG. 6). In this example implementation, as shown at 640, the MSSP/multi-tenant XSOAR implementation facilitates an MSSP provider to manage multiple distributed XSOAR hosts (e.g., as shown at 626*a* and 626*b* in FIG. 6) and to develop and distribute various custom workflows and integration as well as content (e.g., security content) packages for monitor and applying security in these example 5G mobile network environments. As similarly described above, the device contextual information can then be stored as indicators in XSOAR. The distributed XSOAR hosts 626*a* and 626*b* are also in communication with 4G/5G Orchestration API components 618*a* and 618*b*, respectively, using, for example, a RESTful interface (e.g., REST API(s), such as similarly described above with respect to FIG. 3B).

In this example implementation within a managed service provider environment, a multi-tenant distributed architecture using XSOAR can access wireless core networks, and other security or network related devices and platforms as required. This access provides the ability to both access contextual data and perform an action(s) using multiple different protocols or APIs as needed across several different platforms or systems in the environment. For example, as shown in FIG. 6, XSOAR engine 624 is configured to push this context information towards other elements, such as each of the XSOAR engines 626*a* and 626*b* (e.g., such as shown at 640), which can then push to the distributed XSOAR engines 628*a*, 628*b*, 628*c*, 628*d*, 628*e*, and 628*f* as shown in FIG. 6. For example, the communication between the MSSP/multi-tenant XSOAR platform, the XSOAR engines 626*a* and 626*b*, and the distributed XSOAR engines 628*a*, 628*b*, 628*c*, 628*d*, 628*e*, and 628*f* can be performed via RADIUS over HTTPS protocols (e.g., and/or using other protocols and APIs), such as similarly described above with respect to FIG. 3B. Example contextual information includes mobile device identifiers IMEI, IMSI, and/or other contextual information (e.g., IP address, ICCID, RAT, APN, DN, QoS parameters, PLMNID, radio ID (e.g., gNodeB ID), UE State (Connected, Disconnected, Idle, etc.).

As similarly described above with respect to FIG. 3B, security platforms, shown as NGFW 102*a*, NGFW 102*b*, and NGFW 102*c*, can also be in secure communication with a cloud security service (not shown in FIG. 5B). For example, the cloud security service can periodically provide updated security information (e.g., malware classification/detection machine learning trained models, heuristics, signatures, URL allow/block lists, etc.) to the security platforms. Also, the security platforms can upload malware samples to the cloud security service for offline (e.g., rather than just inline) security analysis.

As will now be apparent to those of ordinary skill in the art, the disclosed techniques for data ingestion enabling context awareness and real-time actions in mobile networks can be implemented using various APIs and protocols (e.g., including implementations of push and/or pull APIs with various platforms using centralized, distributed, and/or hybrid implementations for single tenant and/or multi-tenant architectures, including for private wireless networks (e.g., private 4G/5G networks) that are using closed packet core mobile networks that would otherwise not facilitate mobile device visibility for applying security, such as similarly described above with respect to FIGS. 3A-6).

Example use cases for providing a multi-tenant distributed architecture for data ingestion enabling context awareness and real-time actions in mobile networks will now be further described below. For example, the multi-tenant distributed architecture can be applied for managed service providers or companies that have multiple different subsidiaries or organizations that they manage. For instance, if companies 1-N all use a similar service provider (SP) the multi-tenant distributed architecture enables the (SP) to manage both the security, data ingestion, context awareness, and perform real-time actions across the different company 1-N networks.

Example Use Cases for Data Ingestion Enabling Context Awareness and Real-Time Actions in Mobile Networks Various example uses for data ingestion enabling context awareness and real-time actions in mobile networks will now be described.

As a first example use case, a device connects to a 4G/5G network, and traffic logs from a sensor (NGFW) show an application that has never been seen before. The middleware (XSOAR) sends an alert to an admin that a new application is detected.

As a second example use case, assume that a NGFW detects a critical threat and the XSOAR (SOAR) platform receives the threat to provide automated and manual actions including, for example, to disable the device, changing the device behavior, moving the network zone the device is located in, applying specific network policies or profiles, and/or any other detection, remediation, or response capability that is accessible in environment said technology is located in.

As a third example use case, a device is on the network, and the user removes the SIM card, and places it in another device (e.g., their own iPhone). The new device registers to the core with a different IMEI. XSOAR notes this IMEI (device) change and blocks traffic, or quarantines traffic (e.g., or performs some other action, such as based on a configured security policy/rule(s) or communication with the packet core).

As a fourth example use case, a device connects to the network with a spoofed IMEI. Logs sent to a data lake show behavior of a device that does not match this IMEI. An API call or other form of communication is made to the NGFW to block this device's traffic.

As a fifth example use case, device information is imported from a CMDB (Configuration Management Database) (e.g., or from any other types of asset management and inventory management systems) in a private network. Traffic is observed from a device that is not part of the CMDB data. The traffic for that device is restricted to only certain destinations (IT helpdesk, etc.). Alerts are sent to admin staff about the observed traffic of this device.

As a sixth example use case, devices in a CMDB belong to a specific department or group, network segment, or said network zone. XSOAR creates device groups based on the identifiers in the CMDB (e.g., IP address, ICCID, RAT, APN, DN, QoS parameters, PLMNID, radio ID (e.g., gNodeB ID), UE State (Connected, Disconnected, Idle, etc.) and those groupings are pushed to the NGFW. The NGFW can utilize policies based on these groups, allowing or disallowing traffic per group or changing the network behavior for the device.

As a seventh example use case, devices in a CMDB belong to a specific department or group with known owners of the device assets. Based on the department segment information, owners of the department can be notified of threat scenarios based on workflows, requests for approval when needed, etc.

As an eighth example use case, device log correlation is performed using additional commercially available security solutions (e.g., XSIAM, which is commercially available from Palo Alto Networks, Inc., headquartered in Santa Clara, CA) for cross correlating device logs with networks and other log data across the environment to both enrich and provide for threat analysis.

As a ninth example use case, device repository information is enriched using CMDB for additional device identifier information (e.g., including additional device identifiers and field information including, for example, device hardware, device version, operating system (OS) of devices and versioning, and/or other additional device information).

As a tenth example use case, device repository information is synchronized and enriched with additional security service provider and third-party threat intelligence information (e.g., including potential device specific threats based on device field related information, log analytics data, and IoT subscription platforms and additional products by utilizing device information). Based on the type of threat indicators that correlate with device repository information, new incidents and workflows can automatically respond based on the threat indicators.

As a final example use case, general and security threat related workflows can be tailored to specific types of devices, to devices based on CMDB device department segments, owners, and additional fields or correlated data from third-party integrations utilizing APIs and triggering events to and from third-party APIs. Integrations can be custom, built into the platform, or from third-party partners. As an example, security threat related workflows can include disabling devices, blocking, requesting approval, modifying security policies, network flow, and access throughout the environment.

Example process embodiments for providing a multi-tenant distributed architecture for data ingestion enabling context awareness and real-time actions in mobile networks will now be further described below.

Figure 7:
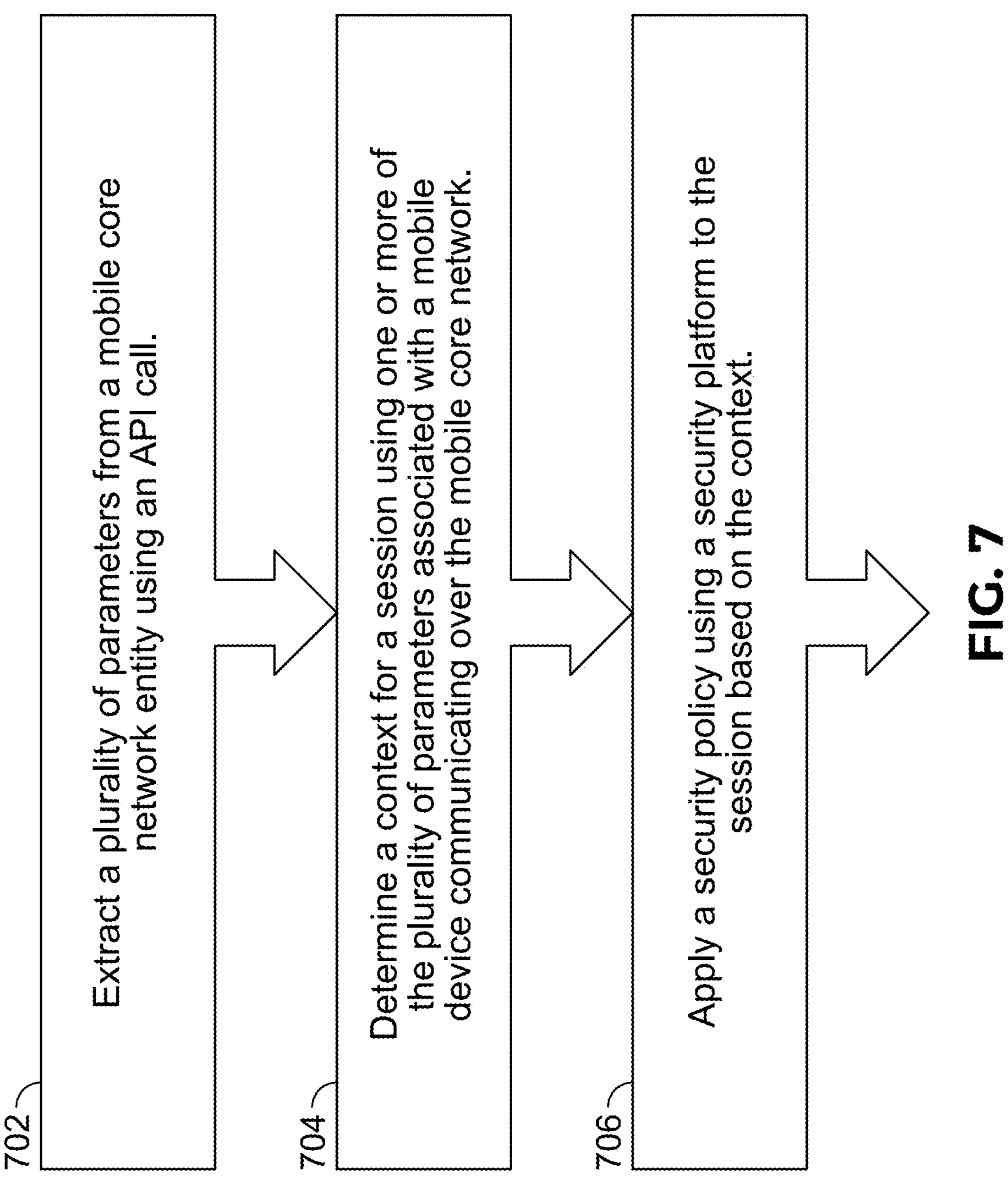
FIG. 7 is a flow diagram for providing a multi-tenant distributed architecture for data ingestion enabling context awareness and real-time actions in mobile networks in accordance with some embodiments.

Process Embodiments for Data Ingestion Enabling Context Awareness and Real-Time Actions in Mobile Networks FIG. 7 is a flow diagram for providing a multi-tenant distributed architecture for data ingestion enabling context awareness and real-time actions in mobile networks in accordance with some embodiments. In some embodiments, a process as shown in FIG. 7 is performed by an XSOAR platform, security platform/NGFW (e.g., associated with a cloud security service), and/or an orchestration API platform and techniques as similarly described above including the embodiments described above with respect to FIGS. 3A-6.

At 702, extracting a plurality of parameters from a mobile core network entity using an application programming interface (API) call is performed. For example, an XSOAR platform can be used to extract contextual information for mobile devices attached to a 4G/5G mobile core network, such as similarly described above with respect to FIGS. 3A-6.

At 704, determining a context for a session using one or more of the plurality of parameters associated with a mobile device communicating over the mobile core network is performed. For example, various APIs and protocols can be used for extracting contextual information to determine the context for a session using one or more of the extracted mobile device identifiers and/or other contextual information associated with the mobile devices attached to the 4G/5G mobile core network, as similarly described above with respect to FIGS. 3A-6.

At 706, applying a security policy using a security platform to the session based on the context is performed. For example, NGFWs can be deployed as an inline security service located outside of the mobile core network and configured to apply security policies/rules based on mobile device identifiers and/or other contextual information, such as similarly described above with respect to FIGS. 3A-6.

Figure 8:
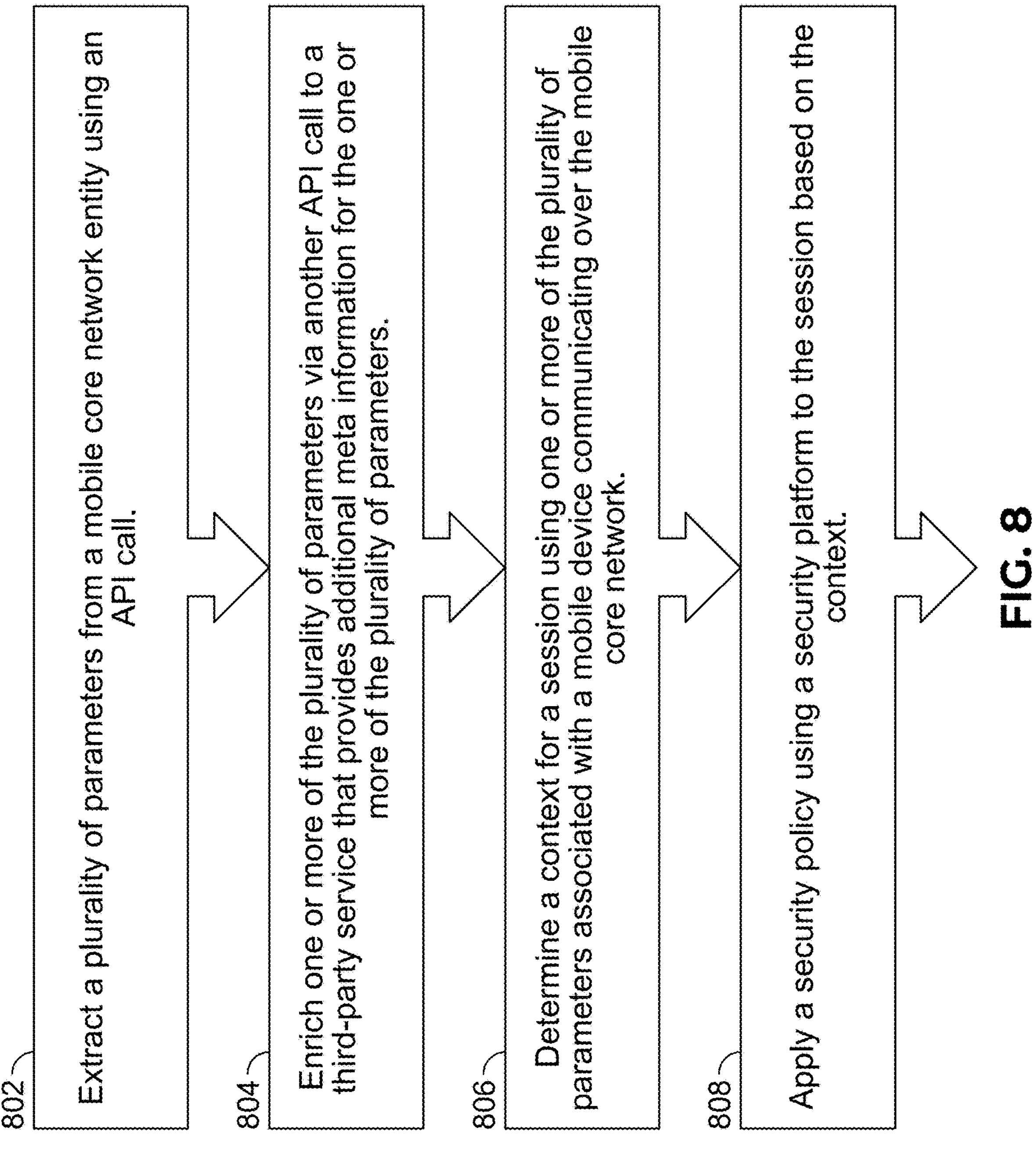
FIG. 8 is a flow diagram for providing a multi-tenant distributed architecture for data ingestion enabling context awareness and real-time actions in mobile networks in accordance with some embodiments.

FIG. 8 is a flow diagram for providing a multi-tenant distributed architecture for data ingestion enabling context awareness and real-time actions in mobile networks in accordance with some embodiments. In some embodiments, a process as shown in FIG. 8 is performed by an XSOAR platform, security platform/NGFW (e.g., associated with a cloud security service), and/or an orchestration API platform and techniques as similarly described above including the embodiments described above with respect to FIGS. 3A-6.

At 802, extracting a plurality of parameters from a mobile core network entity using an application programming interface (API) call is performed. For example, an XSOAR platform can be used to extract contextual information for mobile devices attached to a 4G/5G mobile core network, such as similarly described above with respect to FIGS. 3A-6.

At 804, enriching one or more of the plurality of parameters via another API call to a third-party service that provides additional meta information for the one or more of the plurality of parameters is performed. For example, the plurality of parameters can be enriched using a variety of third-party services, such as similarly described above with respect to FIG. 3B.

For example, device log correlation can be performed using additional commercially available security solutions (e.g., XSIAM, which is commercially available from Palo Alto Networks, Inc., headquartered in Santa Clara, CA) for cross correlating device logs with network and other log data across the environment to both enrich and provide for threat analysis.

As another example, device repository information can be enriched using CMDB for additional device identifier information (e.g., including additional device identifiers and field information including, for example, device hardware, device version, operating system (OS) of devices and versioning, and/or other additional device information).

Yet another example, device repository information can be synchronized and enriched with additional security service provider and third-party threat intelligence information (e.g., including potential device specific threats based on device field related information, log analytics data, and IoT subscription platforms and additional products by utilizing device information). Based on the type of threat indicators that correlate with device repository information, new incidents and workflows can automatically respond based on the threat indicators.

At 806, determining a context for a session using one or more of the plurality of parameters associated with a mobile device communicating over the mobile core network is performed. For example, various APIs and protocols can be used for extracting contextual information to determine the context for a session using one or more of the extracted mobile device identifiers and/or other contextual information associated with the mobile devices attached to the 4G/5G mobile core network, as similarly described above with respect to FIGS. 3A-6.

At 808, applying a security policy using a security platform to the session based on the context is performed. For example, NGFWs can be deployed as an inline security service located outside of the mobile core network and configured to apply security policies/rules based on mobile device identifiers and/or other contextual information, such as similarly described above with respect to FIGS. 3A-6.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:
- a processor configured to:
  - extract a plurality of parameters from a mobile core network entity using an application programming interface (API) call, messages over a message broker, and/or logs from the mobile core network entity, wherein the plurality of parameters includes two or four or more of the following: Integrated Circuit Card Identifier (ICCID), Radio Access Technology (RAT), Access Point Name (APN), Quality of Service (QoS) parameters, Public Land Mobile Network Identifier (PLMNID), radio ID Next Generation Node B identifier (gNodeB ID), User Equipment (UE) State Connected, UE State Disconnected, and/or UE State Idle;
  - determine a context for a session using one or more of the plurality of parameters associated with a mobile device communicating over the mobile core network; and
  - apply a security policy using a security platform to the session based on the context; and
- a memory coupled to the processor and configured to provide the processor with instructions.

2. The system of claim 1, wherein the mobile core network is a 5G mobile core network.

3. The system of claim 1, wherein the mobile core network is a 4G mobile core network.

4. The system of claim 1, wherein the mobile core network is a 4G/5G mobile core network.

5. The system of claim 1, wherein the mobile core network is a private 4G/5G mobile core network.

6. The system of claim 1, wherein the plurality of parameters from the mobile core network are extracted using the API call and sent over a RADIUS protocol.

7. The system of claim 1, wherein the plurality of parameters from the mobile core network are extracted using the API call and sent over a RADIUS protocol in communication with the security platform.

8. The system of claim 1, wherein the plurality of parameters from the mobile core network are extracted using the API call and sent over a RADIUS protocol and using an XSOAR entity in communication with a 4G/5G Orchestration API entity.

9. The system of claim 1, wherein the plurality of parameters from the mobile core network are extracted using the API call and sent over a RADIUS protocol and using an XSOAR entity in communication with a 4G/5G Orchestration API entity using a push and/or a pull protocol.

10. The system of claim 1, wherein the plurality of parameters from the mobile core network are extracted using the API call and sent over a RADIUS protocol and using a centralized XSOAR entity in communication with a 4G/5G Orchestration API entity.

11. The system of claim 1, wherein the plurality of parameters from the mobile core network are extracted using the API call and sent over a RADIUS protocol and using a distributed XSOAR entity in communication with a 4G/5G Orchestration API entity.

12. The system of claim 1, wherein the plurality of parameters from the mobile core network are extracted using the API call and sent over a RADIUS protocol and using a multi-tenant XSOAR entity for a managed security service provider (MSSP) in communication with a 4G/5G Orchestration API entity.

13. The system of claim 1, wherein the processor is further configured to:
- enrich one or more of the plurality of parameters via another API call to a third-party service that provides additional meta information for the one or more of the plurality of parameters.

14. The system of claim 1, wherein the processor is further configured to:
- enrich log data and/or security alert data with context based on the one or more of the plurality of parameters.

15. A method, comprising:
- extracting a plurality of parameters from a mobile core network entity using an application programming interface (API) call, messages over a message broker, and/or logs from the mobile core network entity, wherein the plurality of parameters includes two or four or more of the following: Integrated Circuit Card Identifier (ICCID), Radio Access Technology (RAT), Access Point Name (APN), Quality of Service (QoS) parameters, Public Land Mobile Network Identifier (PLMNID), radio ID Next Generation Node B identifier (gNodeB ID), User Equipment (UE) State Connected, UE State Disconnected, and/or UE State Idle;
- determining a context for a session using one or more of the plurality of parameters associated with a mobile device communicating over the mobile core network; and
- applying a security policy using a security platform to the session based on the context.

16. The method of claim 15, wherein the plurality of parameters from the mobile core network are extracted using the API call and sent over a RADIUS protocol.

17. The method of claim 15, wherein the plurality of parameters from the mobile core network are extracted using the API call and sent over a RADIUS protocol in communication with the security platform.

18. A computer program product embodied in a non-transitory computer readable medium and comprising computer instructions for:
- extracting a plurality of parameters from a mobile core network entity using an application programming interface (API) call, messages over a message broker, and/or logs from the mobile core network entity, wherein the plurality of parameters includes two or four or more of the following: Integrated Circuit Card Identifier (ICCID), Radio Access Technology (RAT), Access Point Name (APN), Quality of Service (QoS) parameters, Public Land Mobile Network Identifier (PLMNID), radio ID Next Generation Node B identifier (gNodeB ID), User Equipment (UE) State Connected, UE State Disconnected, and/or UE State Idle;
- determining a context for a session using one or more of the plurality of parameters associated with a mobile device communicating over the mobile core network; and
- applying a security policy using a security platform to the session based on the context.

19. The computer program product of claim 18, wherein the plurality of parameters from the mobile core network are extracted using the API call and sent over a RADIUS protocol.

20. The computer program product of claim 18, wherein the plurality of parameters from the mobile core network are extracted using the API call and sent over a RADIUS protocol in communication with the security platform.

21. The system of claim 1, wherein the plurality of parameters includes the following: Integrated Circuit Card Identifier (ICCID), Radio Access Technology (RAT), Access Point Name (APN), Quality of Service (QoS) parameters, Public Land Mobile Network Identifier (PLMNID), radio ID Next Generation Node B identifier (gNodeB ID), User Equipment (UE) State Connected, UE State Disconnected, and UE State Idle.

* * * * *